United States Patent [19]

Zimmern

[11] 4,222,691
[45] Sep. 16, 1980

[54] METHOD FOR MACHINING THE SCREW OF A COMPRESSION OR EXPANSION MACHINE AND A DEVICE FOR THE APPLICATION OF SAID METHOD

[75] Inventor: Bernard Zimmern, Neuilly sur Seine, France

[73] Assignee: Uniscrew Limited, Hamilton, Bermuda

[21] Appl. No.: 897,497

[22] Filed: Apr. 18, 1978

[30] Foreign Application Priority Data

Jun. 2, 1977 [FR] France ............................. 77 16861

[51] Int. Cl.² .................... B23F 9/10; B23F 15/00
[52] U.S. Cl. .................................. 409/26; 409/25; 409/48; 409/65
[58] Field of Search ................ 409/66; 409/48, 25, 409/26, 65, 66, 77

[56] References Cited

U.S. PATENT DOCUMENTS

| | | | |
|---|---|---|---|
| 1,812,384 | 6/1931 | Trbojevich | 409/26 |
| 1,965,002 | 7/1934 | Richer | 409/48 |

*Primary Examiner*—Gil Weidenfeld
*Attorney, Agent, or Firm*—Robert F. Ziems

[57] ABSTRACT

A tool having only an end cutting-edge carries out a first movement of penetration into a screw blank so as to produce a groove having flanks substantially parallel to the pinion axis. The tool-holder is angularly displaced with respect to the spindle which carries the screw blank. A second movement of tool penetration takes place while the relative displacement is progressively reduced in order to obtain an inclined flank which produces a V-shaped profile. The screw is intended to form part of a compression and expansion machine and to cooperate with at least one pinion having V-form teeth.

9 Claims, 16 Drawing Figures

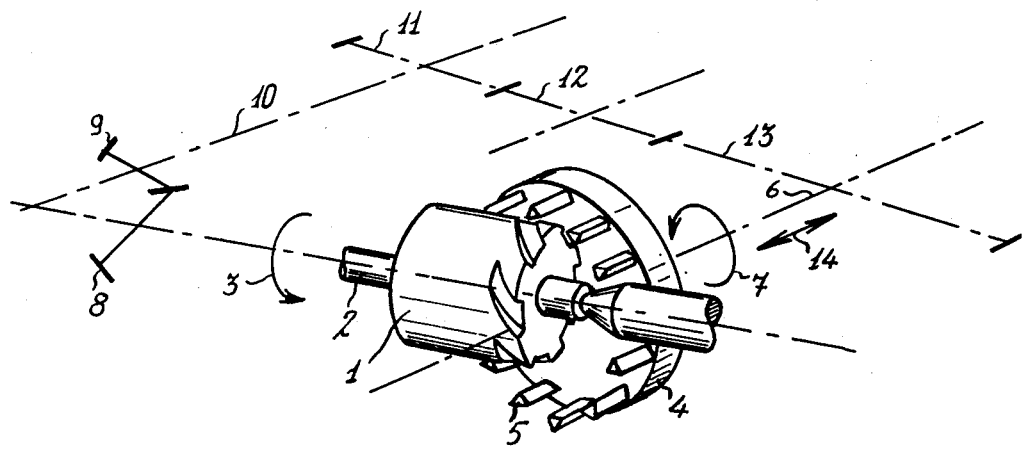
Fig. 1 PRIOR ART
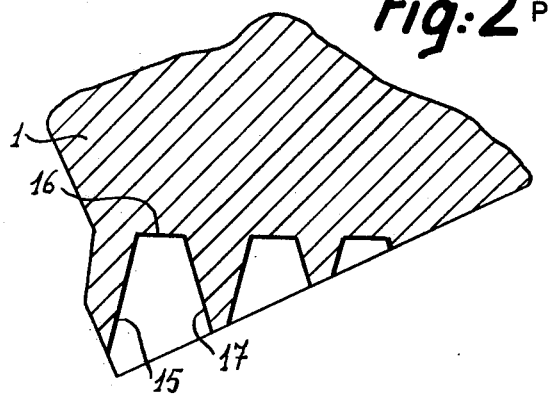
Fig. 2 PRIOR ART
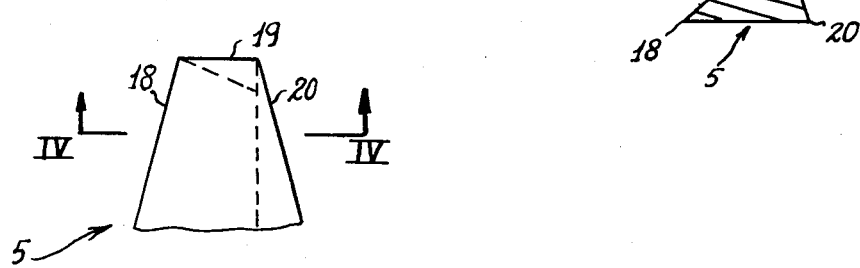
Fig. 3 PRIOR ART
Fig. 4 PRIOR ART

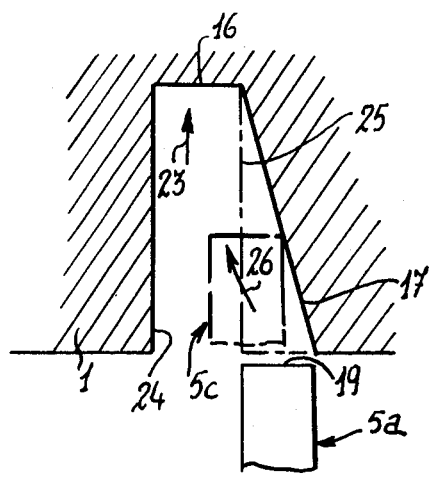
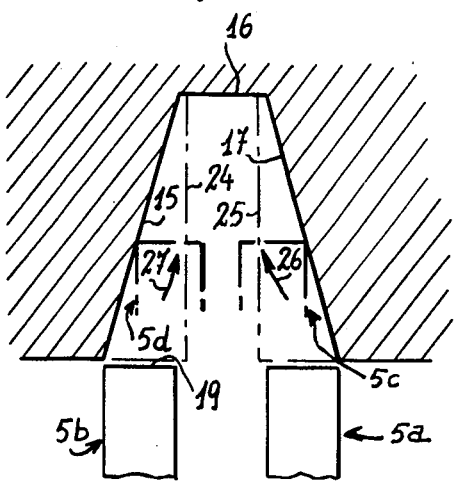
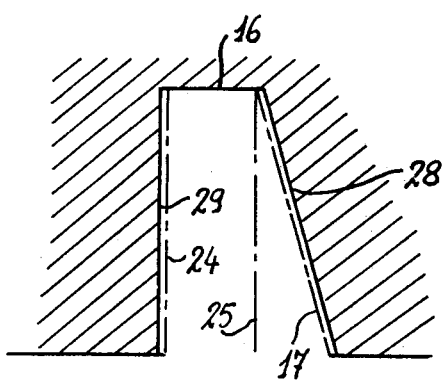
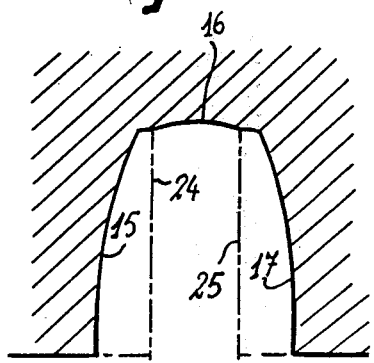

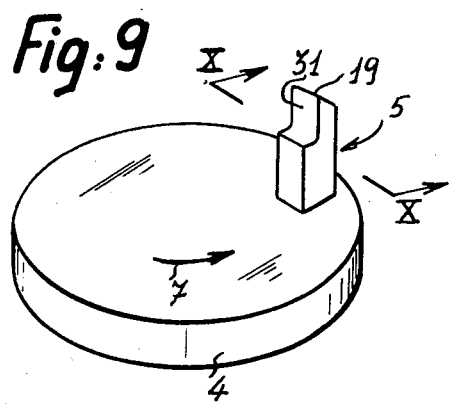
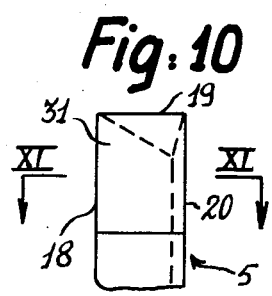
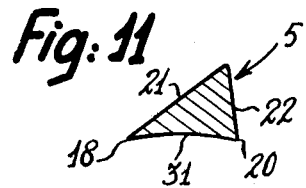
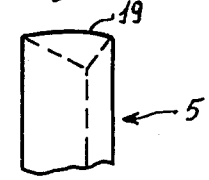
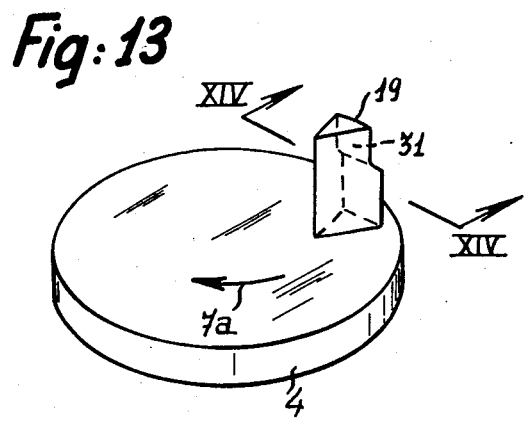
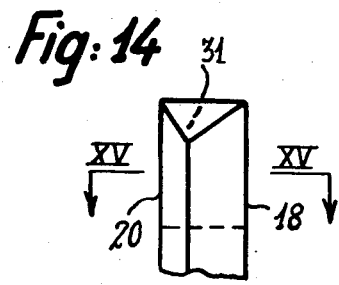
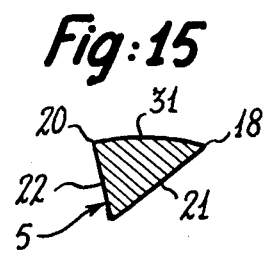

METHOD FOR MACHINING THE SCREW OF A COMPRESSION OR EXPANSION MACHINE AND A DEVICE FOR THE APPLICATION OF SAID METHOD

This invention relates to a method for machining the screw of a compression or expansion machine in which said screw cooperates with at least one pinion. The invention further relates to a device for carrying out this method. Finally, the invention is concerned with a novel industrial product constituted by a screw of given type which is particularly easy to construct by means of the method under consideration.

In more precise terms, the compression or expansion machine mentioned above is of the type described in French Pat. No. 1,586,832 and in its patent of Addition No. 69/00504. This machine comprises a screw forming a rotor and having at least one groove engaged in fluid-tight contact with at least one tooth of a pinion. All the teeth of any one pinion are disposed substantially on a cylinder.

The grooves which are cut in the screw have a V-shaped profile which is adapted to cooperate with a form complementary of the pinion-tooth. Thus the thrust exerted on the pinion along its axis of rotation has the effect of taking up play and improving the fluid-tightness of the machine.

In order to machine a screw of this type, it is possible in accordance with known practice to revolve a screw blank and cut it by means of a tool having a cutting profile which matches the V-shaped profile of a pinion tooth, said cutting tool being driven in the same motion as said tooth during normal operation of the machine, More specifically as shown in the diagram of FIG. 1, a screw blank 1 is fixed on a spindle 2 which rotates in the direction of the arrow 3. A tool-holder 4 which is intended to be advanced towards said blank carries a certain number of cutting tools 5, the distribution of which is similar to that of the teeth on the pinion.

The tool-holder 4 is mounted on a shaft 6 which rotates in the direction of the arrow 7 by means of a kinematic chain which couples said shaft to the spindle 2. Said kinematic chain comprises a bevel pinion 8 which is rigidly fixed to the spindle 2 and cooperates with a bevel pinion 9 keyed on a countershaft 10 on which is also keyed a pinion 11. By means of an intermediate pinion 12, the pinion 11 drives a pinion 13 which is keyed on the shaft 6. The velocity ratio between the spindle 2 and the shaft 6 depends on the number of threads of the screw and on the number of teeth of the pinion. For example, if the screw is intended to have six threads in order to engage with a pinion having seventeen teeth, the spindle 2 must accordingly carry out seventeen revolutions when the shaft 6 makes six revolutions.

By making use of known means, movements of feed and withdrawal can be imparted to the tool-holder 4 as indicated by the double arrow 14.

It will be noted that, in order to produce screws in accordance with the arrangements proposed in French Pat. No. 1,586,832, the respective axes of the spindle 2 and of the shaft 6 are not necessarily at right angles to each other and that in any case they are never in the same plane.

A device of this type makes it possible in theory to form V-grooves as shown in FIG. 2 which is a cross-section of the screw 1 taken by a cylinder corresponding substantially to the cylinder on which the teeth of the pinion are disposed when this latter is assembled with the screw. Each groove has a bottom 16 between two V-shaped flanks 15, 17 which converge inwards to the center of the screw.

The profile just mentioned is obtained by means of a form tool such that both the terminal cutting edge 19 and the lateral cutting edges 18, 20 of the tool (FIGS. 3 and 4) work at the same time.

But, actually, the angle of incidence of a pinion tooth wih the groove flanks with which it cooperates is always either strongly positive or strongly negative and varies to a considerable extent during the path of travel of the tooth in the groove. In consequence, the tool 5 must have substantial relieves which result in greater fragility of the cutting edges 18 and 20. Furthermore, the cutting angle of the tool 5 is also strongly positive or strongly negative and varies to a marked degree. This is not only liable to have an adverse effect on machining efficiency but also to result almost inevitably in breakage of the tool.

One of the aims of the present invention is to provide a method for machining screws of the type contemplated in the foregoing without incurring any abnormal risk of breakage of the cutting tool.

In accordance with the invention, the method is intended to machine the screw of a compression or expansion machine in which said screw cooperates with at least one pinion, at least one groove of the screw being disposed in meshing engagement with at least one tooth of the pinion, all the teeth of any one pinion being disposed substantially on a cylinder and the lines of contact between a screw-groove and the mating tooth flanks being disposed in a V-shape which converges inwards to the center of the screw. This method resists in fixing a screw blank on a spindle which is driven in rotation, in mounting at least one cutting tool on a tool holder whose shaft is coupled to the spindle by means of a kinematic chain or gear train, in progressively displacing the tool-holder along its axis of rotation and in causing the cutting tool to penetrate into the screw blank. The method is characterized by the following steps:

(a) by working solely with the tip of the cutting tool, a first movement of penetration is carried out without changing the relative angular position of the spindle and of the shaft of the tool-holder in the kinematic chain which couples these two elements;

(b) the cutting tool is withdrawn from the screw blank;

(c) an angular displacement of the tool-holder with respect to the spindle is carried out in a predetermined direction in such a manner as to ensure that the tip of the cutting tool is located at least partially opposite to a portion of the screw blank which was not machined during the first movement of penetration;

(d) by working solely with the tip of the cutting tool, a second movement of penetration is carried out while progressively reducing the relative angular displacement;

(e) the cutting tool is withdrawn from the worm.

In the two machining operations proper, the cutting tool works only at the tip and at a constant and favorable cutting angle which practically removes all danger of tool breakage.

Step (a) describes above makes it possible to obtain a groove having flanks substantially parallel to the pinion axis and step (c) makes it possible by cutting one of these flanks to convert it to an inclined flank which produces the required V-shaped profile.

Hereinafter, a flank substantially parallel to the pinion axis will be called a "vertical" flank, being understood that a so-called vertical flank will always correspond to said definition.

In accordance with a particular mode of execution of the method, the relative angular displacement is substantially reduced to zero when the final depth is attained, with the result that the final width of the bottom of the groove is the same as that of the intermediate groove with vertical flanks.

Preferably, the relative angular displacement is carried out in a direction such that, at the time of the second movement of penetration, the groove face to be cut is the face which is intended to cooperate with the pinion-tooth flank located downstream with respect to the normal direction of motion of the tooth.

In machines of the type under consideration, the pinion is driven by the screw and the upstream flank of each tooth is driven by the groove flank with which it cooperates. If this groove flank is vertical, the thrust which it exerts on the tooth does not have any component which tends to drive the pinion tooth out of the screw groove, especially at the time of start-up.

In accordance with an alternative mode of execution of the method, the following steps are carried out:

(f) the tool-holder is angularly displaced with respect to the spindle in the direction opposite to the previous angular displacement with respect to the position of the tool-holder prior to the initial movement of penetration;

(g) by working solely with the tip of the cutting tool, a third movement of penetration is carried out while progressively reducing the relative angular displacement.

At the cost of a longer machining time, there is thus obtained a groove having two inclined flanks of the type described in French Pat. No. 1,586,832.

A further aim of the present invention is to construct a device for machining the screws of machines of the type mentioned above by carrying out the method described in the foregoing.

In accordance with the invention, the device is intended to machine the screw of a compression or expansion machine in which said screw is adapted to cooperate with at least one pinion, at least one groove of the worm being disposed in meshing engagement with at least one tooth of the pinion, all the teeth of any one pinion being disposed substantially on a cylinder and the lines of contact between a screw groove and the mating tooth flanks being disposed in a V-shape which converges inwards to the center of the screw. This device is primarily intended to carry out a method of the type described in the foregoing and accordingly comprises a spindle for receiving a screw blank, means for driving said spindle in rotation, a tool-holder fitted with at least one cutting tool and mounted on a shaft which is coupled to the spindle by means of a kinematic chain, and means for displacing the tool-holder in a direction parallel to its axis of rotation. The device is characterized in that it comprises means for producing a relative angular displacement in the aforementioned kinematic chain prior to the machining operation, and means for progressively reducing said relative angular displacement during the machining operation.

By means of said device, it is possible to carry out all the steps of the method described earlier.

In a particular embodiment of the invention, the means for carrying out the relative angular displacement comprise a train of helical gears forming part of the kinematic chain and means for displacing one of the pinions of said train in the axial direction.

The axial displacement of a helical pinion results in an angular displacement of said pinion with respect to the pinion with which it is in mesh. The desired relative angular displacement between the spindle and the tool-holder is thus obtained.

In an advantageous embodiment of the invention, the means for displacing the tool-holder in a direction parallel to its axis of rotation comprises a feed screw mounted to rotate freely on the tool-holder shaft on which said feed screw is locked axially and cooperates with an internal screw-thread of the casing; and the means for progressively reducing the relative displacement comprises a compensating screw which cooperates with an internal screw-thread of the casing and is mounted to rotate freely but locked axially on a shaft which carries the helical pinion aforesaid, said compensating screw being connected to the feed screw by means of a mechanical coupling.

As it rotates, the compensating screw progressively reduces the axial displacement of the helical pinion to zero while at the same time reducing the relative angular displacement to zero. This operation is sychronized with the feed of the tool by means of the mechanical coupling between the feed screw and the compensating screw.

In a preferred embodiment of the invention, the mechanical coupling aforesaid comprises a train of interchangeable gears, thus making it possible in particular to obtain inclined flanks selected from a wide range of different angles of slope.

In an improved embodiment of the invention, the device comprises means for carrying out a differential relative displacement for a further machining operation, said differential displacement means being provided with means for axially displacing another helical pinion of the kinematic chain which is in mesh with the helical pinion aforesaid.

A further aim of the invention is to produce a screw for a compression or expansion machine as a result of application of the method set forth in the foregoing as well as a machine fitted with a screw of this type.

In particular, a screw having only one inclined groove flank can be formed in a particularly simple manner by means of the present invention. It has been found that screw of this type (which could in any case be produced in a different manner) offer technical advantages which will be explained in detail hereinafter.

Further distinctive features and advantages of the invention will become apparent from the following detailed description, reference being made to the accompanying drawings which are given by way of example and not in any limiting sense, and in which:

FIG. 1 is a diagrammatic view in perspective showing a known device for machining screws of the type considered;

FIG. 2 is a sectional view of a screw of said type;

FIG. 3 is a view in elevation showing a cutting tool of known type for machining the screws under consideration;

FIG. 4 is a sectional view taken along line IV—IV of FIG. 3;

FIG. 5 is a diagram showing the steps of a first embodiment of the method in accordance with the invention;

FIG. 6 is a diagram showing the steps of a second embodiment of the method;

FIG. 7 is a diagram showing an embodiment of the method involving an additional machining operation;

FIG. 8 is a diagram showing an alternative embodiment of the method;

FIG. 9 is a view in perspective showing the toolholder fitted with a cutting tool in accordance with a first arrangement;

FIG. 10 is a partial view of the cutting tool, this view being taken along line X—X of FIG. 9;

FIG. 11 is a sectional view taken along line XI—XI of FIG. 10;

FIG. 12 is a view of the cutting tool which is similar to FIG. 10, in an alternative embodiment;

FIG. 13 is a view in perspective showing the toolholder fitted with a cutting tool in a second arrangement;

FIG. 14 is a partial view of the cutting tool, this view being taken along line XIV—XIV of FIG. 13;

FIG. 15 is a sectional view taken along line XV—XV of FIG. 14;

For the sake of enhanced clarity, the reference numerals of FIGS. 1 to 4 which referred to the prior art are again used to designate similar elements in FIGS. 5 to 16 although it will be understood that these latter relate to the invention and not to the prior art.

Figure 16:
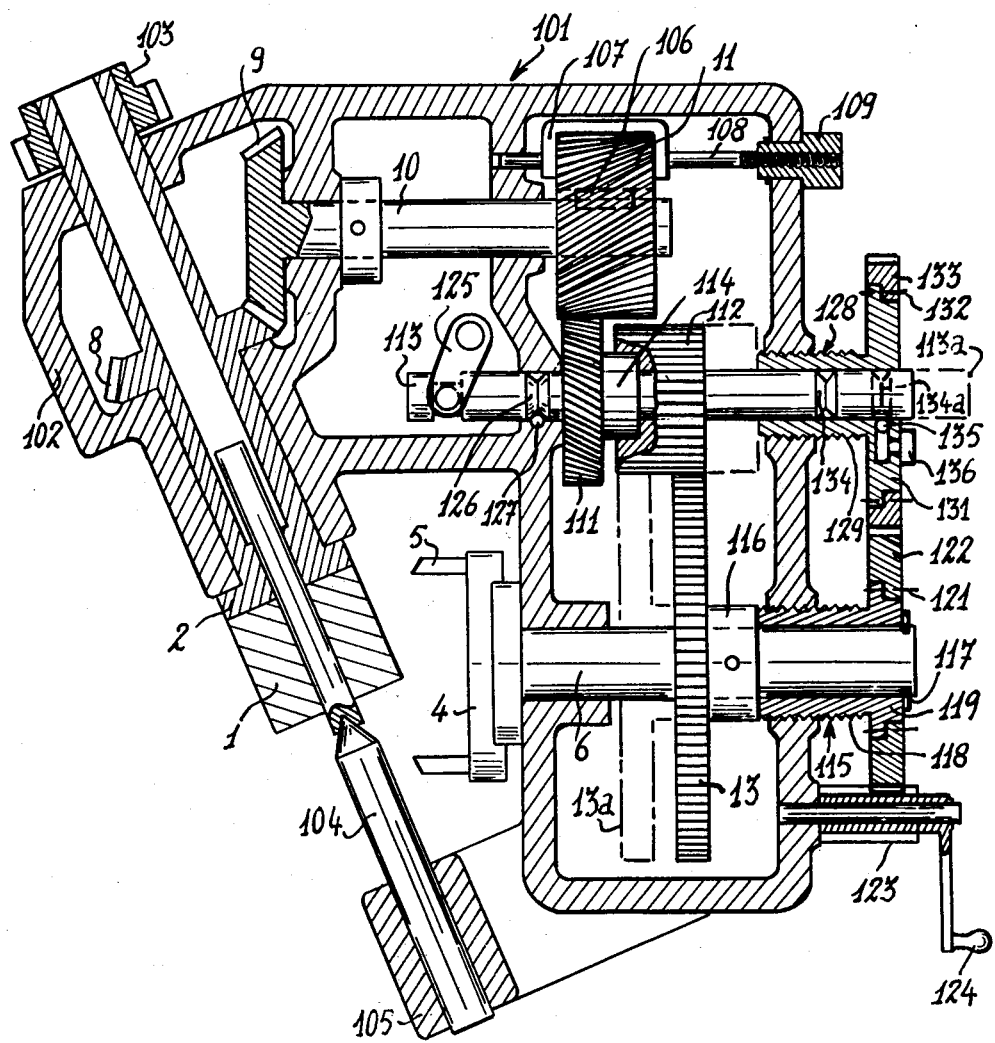
FIG. 16 is a sectional plan view of a machining device in accordance with the invention.

Referring to FIGS. 5, 10 and 11, the method in accordance with the invention essentially consists in cutting the screw blank 1 with a tool 5, only the terminal edge 19 of which is a cutting edge. The edges 18 and 20, which are not cutting edges, are parallel to each other and perpendicular to the terminal cutting edge 19 in the example herein described. There are formed on the rear side of the tool 5 relieves 21, 22 which correspond substantially to the extreme angles made with the front face of the tool by the groove flanks during the machining operation.

A first movement of penetration of the cutting tool 5 into the screw blank is carried out in the direction of the arrow 23 (as shown in FIG. 5), thus forming a groove having two vertical flanks 24, 25.

The cutting tool 5 is then withdrawn from the worm blank 1 and the took-holder is angularly displaced so as to ensure that the tool 5 is located opposite to the screw blank 1 and at least partially opposite to a portion of said blank which has not yet been cut, namely in a position 5a (as shown in FIG. 5).

There is then carried out a second movement of penetration during which the aforesaid relative angular displacement is progressively reduced, with the result that the cutting tool 5 follows the path of travel indicated by the arrow 26 and passes in particular through the intermediate position 5c. During this movement of penetration, the cutting tool forms an inclined flank 17 by removing the material located between the lines 17 and 25.

In FIG. 5, it has been assumed that the relative angular displacement had been reduced to zero during said second movement of penetration, with the result that the lines 17 and 25 meet at the bottom 16 of the screw groove. However, that is a particular circumstance which is in no way specific to the method in accordance with the invention.

It has also been assumed that the reduction of relative angular displacement is linear and that the flank 17 has a rectilinear profile. This condition is in no way imperative, however, and the method in accordance with the invention is equally applicable to the formation of curved flanks (as shown in FIG. 8), the only condition laid down being that the distance between the thread flanks should never increase towards the bottom of the groove.

In order to obtain the different profiles mentioned above, it is only necessary to secure the pinion 13 against axial motion and to lock said pinion and the shaft 6 angularly by means of a pin fixed on the shaft and applied against a cam which is rigidly fixed to the pinion and changed between each movement of penetration. The groove profile is accordingly a function of the cam profile. A more highly improved device will be described hereinafter.

The value of relative angular displacement which brings the cutting tool 5 to the position 5a results from the slope to be given to the inclined flank 17. By means of simple geometrical considerations, anyone versed in the art can determine this value as a function of the depth of the groove and of its variation in width between the bottom of the groove and the crest of the thread.

When forming a groove having one inclined flank and one vertical flank, it has been found preferable to ensure that the inclined flank is the flank which cooperates in the machine with that tooth flank which is located downstream with respect to the normal direction of the displacement of said tooth. In a machine of this type, the screw in fact drives the pinion, with the result that, during a period of acceleration, the action of an inclined groove flank located upstream of the tooth would exert on this latter a force component which is coaxial with the pinion and would tend to drive the tooth out of the groove.

An alternative mode of execution of the method in accordance with the invention is shown in FIG. 6 and is applicable when it is desired to produce a groove profile having two inclined flanks 15, 17. In this alternative form, the method described in the aforegoing is first applied in order to obtain a vertical flank 24 and an inclined flank 17; after the cutting tool 5 has been withdrawn, a second relative angular displacement is carried out in the direction opposite to the preceding in order to bring the tool into the position 5b.

A movement of penetration of the cutting tool is then carried out in the direction of the arrow 27, that is to say by progressively decreasing the relative angular displacement. The cutting tool which passes in particular through the intermediate position 5d then machines an inclined flank 15 by removing the material comprised between the lines 15 and 24. There is thus obtained a V-shaped profile having two inclined flanks 15 and 17.

In FIG. 6, there are shown two positions 5a, 5b which are substantially symmetrical with respect to the axis of the profile as well as two flanks 15, 17 having the same angle of slope. These features are given solely by way of example and are in no way specific to the present invention.

It will also be noted from FIG. 6 that the relative angular displacement is not reduced to zero since the lines 25 and 17 do not meet on the bottom 6 of the groove and the same applies to the lines 24 and 15.

Whatever mode of execution of the method may be adopted, the cutting tool 5 works solely at the tip by means of its single cutting edge 19. The lateral edges 18 and 20 do not play any part in the cutting operation, with the result that no problem arises in connection with the cutting angle and that any potential danger of tool breakage is consequently removed.

The machining operation can be completed by a finishing operation as shown diagrammatically in FIG. 7. On completion of a first machining operation as explained earlier with reference to FIG. 5, the two movements of penetration already performed are accordingly repeated by adding to the relative angular displacement previously employed a differential relative displacement which makes it possible to machine a final flank 28 by removing the material comprised between the lines 17 and 28. The same operation is performed in the case of the vertical flank 24 in order to obtain the final vertical flank 29.

The differential relative displacement thus added is intended to remove a constant thickness of material and does not need to be reduced during the movement of tool penetration.

As can readily be understood, the finishing operation can be carried out not only on a V-shaped profile having one vertical flank as shown in FIG. 7 but also on a V-shaped profile having two inclined flanks.

In order to machine a screw in accordance with the diagram of FIG. 1 or in other words a screw having a right-hand thread, the cutting tool 5 can be placed with its cutting face directed towards the center of the tool-holder 4 (as shown in FIG. 9). The tool-holder must then rotate in the direction of the arrow 7 (as shown in FIGS. 1 and 9).

The tool 5 can also be placed with its cutting face directed outwards from the tool-holder 4 (as shown in FIG. 13) but in this case the tool-holder must rotate in the opposite direction as indicated by the arrow 7a. Correlatively, the direction of rotation of the spindle 2 which carries the screw blank 1 must also be reversed.

Since the lateral edges 18, 20 of the tool 5 do not play any part in the cutting operation, they need not necessarily be rectilinear as shown in the different figures. These edges can be curved provided that they are located within the prism formed by the cutting tool 5 as shown in FIG. 10.

The tooth of the pinion which is intended to cooperate with the machined screw can have a rounded tip. This feature can be taken into account by giving the same rounded shape to the cutting edge 19 (as shown in FIG. 12).

Similarly, since the pinion teeth are disposed at intervals on a cylinder, at least one face of each tooth can conform to said cylinder and have a rounded shape. The cutting tool can also be made to conform to this rounded shape by curving the cutting face 31. Depending on whether this cutting face is directed towards the center of the tool-holder (as shown in FIG. 9) or outwards from the tool-holder (as shown in FIG. 13), said cutting face is either concave (as shown in FIG. 11) or convex (as shown in FIG. 15).

There will now be described with reference to FIG. 16 a device for machining screws of the type under consideration and for the practical application of the method hereinabove described.

A casing 101 carries an extension 102, a spindle 2 which carries a screw blank 1 being mounted within said extension. The spindle 2 carries at one end a pinion 103 which is intended to be coupled to a reduction-gear motor system of known type (not illustrated). The spindle 2 is supported at the other end by a back-center 104 which is rotatably mounted within another extension 105 of the casing 101.

The casing 101 also carries a shaft 6 which is capable of both translational and rotational motion as will be explained hereinafter and on which is fixed a tool-holder 4 fitted with cutting tools 5. Provision can be made for any desired number of cutting tools but these latter must be so arranged as to machine the desired screw grooves in the blank 1. The number of tools should preferably correspond to the number of teeth on the pinion which is intended to cooperate with the machined screw.

It should be recalled at this point that the respective axes of the spindle 2 and of the shaft 6 are not located in the same plane. In consequence, FIG. 16 is in fact a false cross-section or, more precisely, comprises two cross-sections in different planes which are projected on the same figure plane.

The spindle 2 and the shaft 6 are coupled mechanically by means of a kinematic chain or gear train which will be described hereinafter.

The spindle 2 carries a bevel pinion 8 disposed in meshing engagement with another bevel pinion 9 keyed on one end of a shaft 10 which is carried by the casing 101 and is substantially parallel to the shaft 6 of the tool-holder 4.

At the other end, the shaft 10 carries a helical pinion 11 which is locked rotationally with the shaft by means of a key 106 but is capable of moving freely in the axial direction and can be placed in a predetermined axial position by means of a fork 107 fitted with a screw 108 in cooperating relation with a nut 109 which can be operated from the exterior of the casing 101.

The helical pinion 11 meshes with another helical pinion 111 which is rigidly fixed to a coaxial spur-tooth pinion 112 by making use of any suitable fastening means such as screws (not shown in the figure). The unit formed by the two pinions 111 and 112 which corresponds to the intermediate pinion 12 of FIG. 1 is mounted to rotate freely on a shaft 113 carried by the casing 101 but is locked axially on said shaft by means of an annular shoulder 114 which is engaged between said two pinions.

Finally, the spur-tooth pinion 112 is disposed in meshing engagement with a pinion 13 and this latter is rigidly fixed to the shaft 6 which carries the tool-holder 4.

The ratios of the different toothed gears and pinions described in the foregoing are so determined as to ensure that the ratio of respective speeds of the spindle 2 and of the tool-holder 4 has a suitable value as indicated earlier.

At the end remote from the tool-holder 4, the shaft 6 carries a sleeve 115 which is rotatably mounted on said shaft and secured against axial motion between an annular abutment 116 and a circlip 117. Said sleeve is provided with an external screw-thread 118 which cooperates with a complementary internal screw-thread of the casing 101 in order to constitute a feed screw. Said feed screw 115 is provided with an annular flange 119 on which a toothed ring 122 is removably fixed by means of screws 121, for example. Said toothed ring is disposed in meshing engagement with a pinion 123 which is carried by the casing 101 and provided with a feed crank-handle 124.

It is apparent that a movement of axial feed or advance can be imparted to the tool-holder 4 independently of the movements of rotation of the spindle 2 and of the tool-holder 4 by operating the crank-handle 124. When the maximum distance of forward travel has been reached, the pinion 13 has come into position 13a.

In the mode of operation which has just been described, there corresponds to each given angular position of the spindle 2 a predetermined angular position of the tool-holder 4 which is always the same irrespective of the rate of the feed operation and is without influence on the kinematic rotational coupling between the spindle 2 and the tool-holder 4. Under these conditions, the machining obtained on the screw blank 1 consists of grooves having vertical flanks.

There will now be described the arrangements which make it possible in accordance with the invention to produce a relative displacement between the angular positions mentioned in the foregoing in order to obtain grooves having inclined flanks.

The shaft 113 on which is mounted the unit formed by the two pinions 111 and 112 is mounted for axial sliding motion and can be operated by means of a fork 125 which is pivotally mounted at one end and can be actuated by means of an external crank-handle (not shown in the figure).

The shaft 113 has an annular grove 125 which is intended to cooperate with a releasable locking-pin 127 and this latter is placed within the casing so as to secure the shaft against axial motion in the position shown in full lines. This position corresponds to the mode of operation which was described earlier and is intended to obtain a groove having a vertical flank.

In the vicinity of the end remote from the fork 125, the shaft 113 is supported by the casing 101 by means of a sleeve 128 which is rotatably mounted and capable of sliding freely on the shaft 113. Said sleeve 128 is provided with an external screw-thread 129 so as to form a compensating screw which is provided with an annular flange 131. A toothed ring 133 is removably fixed on said annular flange by means of screws 132, for example, and is disposed in meshing engagement with the toothed ring 122 carried by the feed screw 118.

The shaft 113 is provided in the vicinity of the screw 128 with an annular groove 134 and this latter is intended to cooperate with a releasable locking-pin 135 which is fixed in the annular flange 131 and can be actuated between locking and released conditions by means of an external knob 136.

When a groove having vertical flanks has been machined as indicated in the foregoing and when the cutting tools 5 have been withdrawn from the screw blank 1, the locking-pin 127 is released from the annular groove 126 and the fork 125 is operated in order to displace the shaft 113 toward the right-hand side of FIG. 16, whereupon said shaft comes into the position 113a which is shown in chain-dotted lines in the figure.

The annular groove 134 has then come into position opposite to the locking-pin 135 at 134a. Said locking-pin is engaged within said annular groove by means of the operating knob 136 in order to lock the compensating screw 128 axially with the shaft 113.

The movement of translation thus applied to the shaft 113 also affects the helical pinion 111 which is locked axially on the shaft 113 by means of the annular shoulder 114. This results in a relative angular displacement between the helical pinions 11 and 111, thus producing a relative angular displacement between the screw blank 1 and the tool-holder 4.

A second movement of tool penetration is then carried out by actuating the crank-handle 124. At the same time, however, the compensating screw 128 is caused to rotate under the action of the toothed rings 122 and 133 while being displaced in translational motion towards the left-hand side of the figure and accompanied in this displacement by the shaft 113 and the helical pinion 111 which moves towards the initial position occupied by this latter prior to the relative angular displacement operation. In consequence, said relative angular displacement between the helical pinions 11 and 111 and correspondingly between the screw blank 1 and the tool-holder 4 is progressively reduced during the movement of tool penetration which makes it possible to obtain an inclined flank.

It is possible to compensate either wholly or partially for the initial relative displacement and to give any desired angle of slope to the flank by suitably selecting the thread pitch of the compensating screw 128 and the tooth ratio of the toothed rings 122 and 133.

On the basis of the foregoing considerations, complementary arrangements can be adopted by those versed in the art in order to carry out and then progressively compensate for a relative angular displacement of opposite direction which makes it possible to obtain another inclined flank during a third movement of tool penetration.

After each aforementioned movement of penetration, it is possible to produce an identical repetition of said movement but by carrying out an additional differential angular displacement. By operating the nut 109, the helical pinion 11 is subjected to a translational movement by means of the fork 107. By virtue of the helical teeth, said helical pinion produces an angular displacement under the same conditions as those mentioned earlier. This additional relative displacement serves to carry out finish-machining operations as shown in FIG. 7. It will be noted that said additional relative displacement remains fixed during the movement of tool penetration since it is not associated with any compensating device, with the result that the lines 17, 28 and 24, 29 of FIG. 7 are parallel.

The method in accordance with the invention and the associated device permit machining of screws of the type hereinabove specified without any abnormal risk of tool breakage since the tool works solely at the tip at a constant and favorable cutting angle.

It will be readily understood that the invention is not limited to the examples hereinabove described and that many alternative forms of construction and especially the alternative embodiments mentioned in the description could accordingly be devised without thereby departing either from the scope or the spirit of the invention.

I claim:

1. In a method for machining a compression or expansion machine screw in which said screw cooperates with at least one pinion, the screw having at least one groove disposed in meshing engagement with at least one tooth of the pinion, all the teeth of any one pinion being disposed substantially on a cylinder and the lines of contact between a screw thread and the mating tooth flanks being disposed in a V which converges inwards to the center of the screw and in which said method comprises the steps of fixing a screw blank on a spindle which is driven in rotation, mounting at least one cutting tool on a tool-holder the shaft of which is coupled to the spindle by means of a kinematic chain, progressively displacing the tool-holder along its axis of rotation and causing the cutting tool to penetrate into the screw blank, the improvement comprising the further steps of:
- (a) effecting a first movement of penetration by working solely with the tip of the cutting tool, without changing the relative angular position of the spindle and of the shaft of the tool-holder in the kinematic chain which couples these two elements;
- (b) withdrawing the cutting tool from the screw blank;
- (c) effecting a relative angular displacement of the tool-holder with respect to the spindle in a predetermined direction and to locate the tip of the cutting tool at least partially opposite to a portion of the screw blank which was not machined during the first movement of tool penetration;
- (d) effecting a second movement of penetration by working solely with the tip of the cutting tool, while progressively reducing said relative angular displacement; and
- (e) withdrawing the cutting tool from the screw.

2. A method according to claim 1, wherein said relative angular displacement is substantially reduced to zero when the final depth is attained at the end of said second movement of tool penetration.

3. A method according to claim 1, wherein the relative angular displacement is carried out in a direction such that at the time of the second movement of tool penetration, the groove face to be cut is the face which is intended to cooperate with the pinion-tooth flank located downstream with respect to the normal direction of motion of said tooth when the screw machined is mounted and operating in a compression or expansion machine.

4. A method according to claim 1, comprising the following additional steps of:
- (f) angularly displacing the tool-holder with respect to the spindle in the direction opposite to the previous angular displacement with respect to the position of said tool-holder prior to said first movement of tool penetration; and
- (g) carrying out a third movement of penetration by working solely with the tip of the cutting tool, while progressively reducing the relative angular displacement.

5. In a device for machining a compression or expansion machine screw in which said screw is adapted to cooperate with at least one pinion, the screw having at least one groove disposed in meshing engagement with at least one tooth of said pinion, all the teeth of any one pinion being disposed substantially on a cylinder and the lines of contact between a screw groove and the mating tooth flanks being disposed in a V which converges inwards to the center of the screw, said device being such as to comprise a spindle for receiving a screw blank, means for driving said spindle in rotation, a tool-holder fitted with at least one cutting tool and mounted on a shaft which is coupled to said spindle by means of a kinematic chain, and means for displacing the tool-holder in a direction parallel to its axis of rotation, the improvement comprising:
means for producing a relative angular displacement in the aforementioned kinematic chain prior to the machining operation, and means for progressively reducing said relative angular displacement during the machining operation.

6. A device according to claim 5 including a casing and wherein the kinematic chain comprises a gear train placed within said casing, wherein said means for producing a relative angular displacement comprise a train of helical gears forming part of said kinematic chain and means for displacing one of the gears of said train of helical gears in the axial direction.

7. A device according to claim 6, wherein the means for displacing the tool-holder in a direction parallel to its axis of rotation comprises a feed screw mounted to rotate freely on the tool-holder shaft on which said feed screw is locked axially, an internal screw-thread fixed in the casing and cooperating with said feed screw, wherein said means for progressively reducing said relative angular displacement comprises a shaft carrying one of said helical gears, a compensating screw which is adapted to cooperate with another internal screw-thread on said casing and is mounted to rotate freely but locked axially on said shaft carrying one of said helical gears, said compensating screw being connected to said feed screw by a mechanical coupling having a constant coupling ratio.

8. A device according to claim 7, wherein the mechanical coupling between the feed screw and the compensating screw comprises a train of interchangeable gears.

9. A device according to claim 7, wherein said device comprises means for carrying out a differential relative displacement for an additional machining operation, said differential displacement means including means for axially displacing another helical gear of the kinematic chain which is in mesh with said one helical gear aforesaid.

* * * * *